US011875264B2

(12) United States Patent
Chaudhury et al.

(10) Patent No.: US 11,875,264 B2
(45) Date of Patent: Jan. 16, 2024

(54) ALMOST UNSUPERVISED CYCLE AND ACTION DETECTION

(71) Applicant: R4N63R Capital LLC, Wilmington, DE (US)

(72) Inventors: Krishnendu Chaudhury, Saratoga, CA (US); Ananya Honnedevasthana Ashok, Bangalore (IN); Sujay Narumanchi, Bangalore (IN); Devashish Shankar, Gwalior (IN); Ashish Mehra, Sunnyvale, CA (US)

(73) Assignee: R4N63R Capital LLC, Wilmington, DE (US)

( * ) Notice: Subject to any disclaimer, the term of this patent is extended or adjusted under 35 U.S.C. 154(b) by 649 days.

(21) Appl. No.: 16/823,227

(22) Filed: Mar. 18, 2020

(65) Prior Publication Data

US 2021/0216777 A1   Jul. 15, 2021

Related U.S. Application Data

(60) Provisional application No. 62/961,407, filed on Jan. 15, 2020.

(51) Int. Cl.
*G06N 3/084* (2023.01)
*G06F 18/214* (2023.01)
(Continued)

(52) U.S. Cl.
CPC .......... *G06N 3/084* (2013.01); *G06F 18/214* (2023.01); *G06F 18/2163* (2023.01);
(Continued)

(58) Field of Classification Search
None
See application file for complete search history.

(56) References Cited

U.S. PATENT DOCUMENTS

| 10,909,442 | B1* | 2/2021 | Szarvas | G06N 3/08 |
| 2015/0208023 | A1* | 7/2015 | Boyle | G11B 27/034 |
| | | | | 386/278 |
| 2019/0220573 | A1* | 7/2019 | Kwon | G16C 20/80 |

FOREIGN PATENT DOCUMENTS

| CN | 110245677 A | * | 9/2019 | |
| CN | 110796081 A | * | 2/2020 | G06K 9/00335 |

(Continued)

*Primary Examiner* — Mohammed Rachedine
(74) *Attorney, Agent, or Firm* — DORSEY & WHITNEY LLP

(57) ABSTRACT

An event detection method can include encoding a plurality of training video snippets into low dimensional descriptors of the training video snippets in a code space. The low dimensional descriptors of the training video snippets can be decoded into corresponding reconstructed video snippets. One or more parameters of the encoding and decoding can be adjusted based on one or more a loss functions to reduce a reconstruction error between the one or more training video snippets and the corresponding one or more reconstructed video snippets, to reduce a class entropy of the plurality of event classes of the code space, to increase fit of the training video snippet, and/or to increase compactness of the code space. The method can further include encoding one or more labeled video snippets of a plurality of event classes into low dimensional descriptors of the labeled video snippets in the code space. The plurality of event classes can be mapped to class clusters corresponding to the low dimensional descriptors of the labeled video snippets. After training, query video snippets can be encoded into corresponding low dimensional descriptors in the code space. The low dimensional descriptors of the query video snippets can be classified based on their respective proximity to a nearest one of a plurality of class cluster of the code space. An event class of the query video snippet can be determined based on the class cluster classification.

26 Claims, 10 Drawing Sheets

(51) Int. Cl.
　　　*G06F 18/21*　　　(2023.01)
　　　*G06F 18/23*　　　(2023.01)
　　　*G06F 18/2413*　　(2023.01)
　　　*G06F 18/2431*　　(2023.01)
　　　*G06F 18/22*　　　(2023.01)
　　　*G06F 18/2321*　　(2023.01)
　　　*G06N 3/045*　　　(2023.01)
　　　*G06N 3/047*　　　(2023.01)
　　　*G06V 20/40*　　　(2022.01)
　　　*G06V 10/74*　　　(2022.01)
　　　*G06V 10/762*　　 (2022.01)
　　　*G06V 10/77*　　　(2022.01)
　　　*G06V 10/82*　　　(2022.01)
　　　*G06V 40/20*　　　(2022.01)

(52) U.S. Cl.
　　　CPC .......... *G06F 18/23* (2023.01); *G06F 18/2431* (2023.01); *G06F 18/24137* (2023.01); *G06V 10/761* (2022.01); *G06V 10/763* (2022.01); *G06V 10/7715* (2022.01); *G06V 10/82* (2022.01); *G06V 20/41* (2022.01); *G06V 20/49* (2022.01); *G06V 40/20* (2022.01); *G06V 20/44* (2022.01)

(56) References Cited

FOREIGN PATENT DOCUMENTS

| | | | | |
|---|---|---|---|---|
| CN | 111149108 A | * | 5/2020 | .............. G06F 17/11 |
| WO | WO-2015056024 A1 | * | 4/2015 | ......... G06F 16/5838 |
| WO | WO-2021058710 A1 | * | 4/2021 | ........... G06N 3/0454 |

* cited by examiner

ALMOST UNSUPERVISED CYCLE AND ACTION DETECTION

CROSS-REFERENCE TO RELATED APPLICATIONS

This application claims the benefit of U.S. Patent Provisional Application No. 62/961,407 filed Jan. 15, 2020, which is incorporated herein in its entirety.

BACKGROUND OF THE INVENTION

Conventional Neural Networks can perform cycle and action detection on videos utilizing full supervision techniques. Fully supervised techniques require videos with a very large number of manually labelled frames for training. While this can provide relatively accurate models, the amount of manual curation needed is somewhat daunting. For instance, current cycle and action detecting neural networks are typically trained upon hundreds or even thousands of cycles. For a large manufacturing application, hours of labelled video per manufacturing station can be required. For example, in one conventional cycle and action detector, video of 200 cycles with an average video cycle of 30 second requires 1.7 hours of labeled video per station. For a manufacturing process having 100 stations, 170 hours of labelled video needs to be manually curated. This problem becomes much worse as the number of stations increases. Furthermore, because of the amount of manual curation, the labelling of videos is prone to human errors.

Recent advances in Neural Network technology makes it possible to attempt unsupervised (zero manually labelled training data) and/or self-supervised (very small volume of manually labelled training data) cycle/action detection. However, the accuracy of unsupervised and self-supervised cycle/action detection techniques are current significantly lower than fully supervised techniques.

SUMMARY OF THE INVENTION

The present technology may best be understood by referring to the following description and accompanying drawings that are used to illustrate embodiments of the present technology directed toward almost unsupervised cycle and/or action detection.

In this disclosure, novel techniques are described which can get substantially the same range of accuracy as fully supervised networks, but with as few as a single manually labelled cycle for each event to be detected, which can result in a substantial time reduction in the labelling effort.

In one embodiment, an event detection method can include receiving a query video snippet. The query video snippet can be encoded into a low dimensional descriptor of a code space. The code space includes a plurality of class clusters characterized by one or more of a minimum trending reconstruction error, a minimum trending class entropy, a maximum trending fit of video snippets and a maximum trending compactness of the code space. The low dimensional descriptor of the query video snippet can be classified based on its proximity to a nearest one of a plurality of class clusters of the code space. An indication of an event class of the query video snippet based on the classified class cluster of the low dimensional descriptor of the query video snippet can be output. In one implementation, the event classes can include a cycle class and a not cycle class. In another implementation, the event classes can include a plurality of action cycle classes.

In another embodiment, an event detection device can include a neural network encoder, a neural network decoder, a loss function and a class cluster classifier. During a training phase, the neural network encoder can be configured to encode a plurality of training video snippets into low dimensional descriptors of the training video snippets in the code space. The neural network decoder can be configured to decode the low dimensional descriptors of the training video snippets into corresponding reconstructed video snippets. The loss function can be configured to adjust one or more parameters of the neural network encoder and the neural network decoder based on one or more objective functions selected from a group including to reduce a reconstruction error between the one or more training video snippets and the corresponding one or more reconstructed video snippets, reduce class entropy of the plurality of event classes of the code space, increase fit of the training video snippets, and increase compactness of the code space. The neural network encoder can be further configured to encode one or more labeled video snippets of a plurality of event classes into low dimensional descriptors of the labeled video snippets in the code space. The class cluster classifier can be configured to map the plurality of event classes to class clusters corresponding to the low dimensional descriptors of the labeled video snippets.

During an inference phase, the neural network encoder can be further configured to encode a query video snippet into a low dimensional descriptor of the code space. The class cluster classifier can be further configured to classify the low dimensional descriptor of the query video snippet based on its proximity to a nearest one of a plurality of class clusters of the code space and output an indication of an event class of the query video snippet based on the classified class cluster of the low dimensional descriptor of the query video snippet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
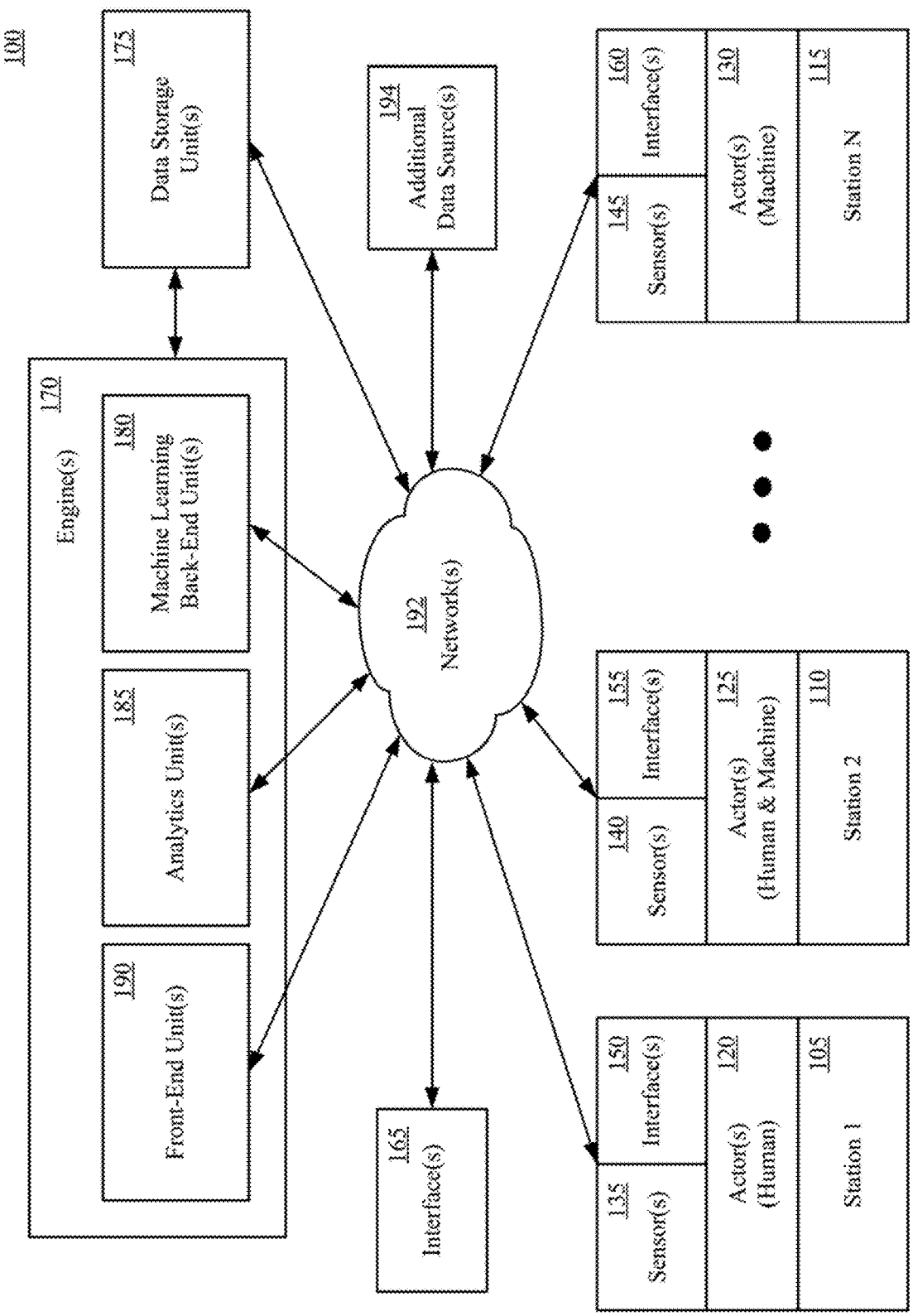
FIG. 1 shows a cycle or action recognition and analytics system, in accordance with aspect of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and/or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or intervening element may be present. In contrast, when an element is referred to as being "directly connected" to another element, there are not intervening elements present. It is also to be understood that the term "and/or" includes any and all combinations of one or more of the associated elements. It is also to be understood that the phraseology and terminology used herein is for the purpose of description and should not be regarded as limiting.

As used herein the term process can include processes, procedures, transactions, routines, practices, and the like. As used herein the term sequence can include sequences, orders, arrangements, and the like. As used herein the term action can include actions, steps, tasks, activity, motion, movement, and the like. As used herein the term object can include objects, parts, components, items, elements, pieces, assemblies, sub-assemblies, and the like. As used herein a process can include a set of actions or one or more subsets of actions, arranged in one or more sequences, and performed on one or more objects by one or more actors. As used herein a cycle can include a set of processes or one or more subsets of processes performed in one or more sequences. As used herein a sensor stream can include a video sensor stream, thermal sensor stream, infrared sensor stream, hyperspectral sensor stream, audio sensor stream, depth data stream, and the like. As used herein frame based sensor stream can include any sensor stream that can be represented by a two or more dimensional array of data values. As used herein the term parameter can include parameters, attributes, or the like. As used herein the term indicator can include indicators, identifiers, labels, tags, states, attributes, values or the like. As used herein the term feedback can include feedback, commands, directions, alerts, alarms, instructions, orders, and the like. As used herein the term actor can include actors, workers, employees, operators, assemblers, contractors, associates, managers, users, entities, humans, cobots, robots, and the like as well as combinations of them. As used herein the term robot can include a machine, device, apparatus or the like, especially one programmable by a computer, capable of carrying out a series of actions automatically. The actions can be autonomous, semi-autonomous, assisted, or the like. As used herein the term cobot can include a robot intended to interact with humans in a shared workspace. As used herein the term package can include packages, packets, bundles, boxes, containers, cases, cartons, kits, and the like. As used herein, real time can include responses within a given latency, which can vary from sub-second to seconds.

Referring to FIG. 1 a cycle and/or action recognition and analytics system, in accordance with aspect of the present technology, is shown. The cycle and/or action recognition and analytics system 100 can be deployed in a manufacturing, health care, warehousing, shipping, retail, restaurant or similar context. A manufacturing context, for example, can include one or more stations 105-115 and one or more actors 120-130 disposed at the one or more stations. The actors can include humans, machines or any combination thereof. For example, individual or multiple workers can be deployed at one or more stations along a manufacturing assembly line. One or more robots can be deployed at other stations. A combination of one or more workers and/or one or more robots can be deployed at additional stations. It is to be noted that the one or more stations 105-115 and the one or more actors are not generally considered to be included in the cycle and/or action recognition and analytics system 100.

In a health care implementation, an operating room can comprise a single station implementation. A plurality of sensors, such as video cameras, thermal imaging sensors, depth sensors, or the like, can be disposed non-intrusively at various positions around the operating room. One or more additional sensors, such as audio, temperature, acceleration, torque, compression, tension, or the like sensors, can also be disposed non-intrusively at various positions around the operating room.

In a shipping implementation, the plurality of stations may represent different loading docks, conveyor belts, forklifts, sorting stations, holding areas, and the like. A plurality of sensors, such as video cameras, thermal imaging sensors, depth sensors, or the like, can be disposed non-intrusively at various positions around the loading docks, conveyor belts, forklifts, sorting stations, holding areas, and the like. One or more additional sensors, such as audio, temperature, acceleration, torque, compression, tension, or the like sensors, can also be disposed non-intrusively at various positions.

In a retailing implementation, the plurality of stations may represent one or more loading docks, one or more stock rooms, the store shelves, the point of sale stands (e.g. cashier stands, self-checkout stands and auto-payment geofence), and the like. A plurality of sensors such as video cameras, thermal imaging sensors, depth sensors, or the like, can be disposed non-intrusively at various positions around the loading docks, stock rooms, store shelves, point of sale stands and the like. One or more additional sensors, such as audio, acceleration, torque, compression, tension, or the like sensors, can also be disposed non-intrusively at various positions around the loading docks, stock rooms, store shelves, point of sale stands and the like.

In a warehousing or online retailing implementation, the plurality of stations may represent receiving areas, inventory storage, picking totes, conveyors, packing areas, shipping areas, and the like. A plurality of sensors, such as video cameras, thermal imaging sensors, depth sensors, or the like, can be disposed non-intrusively at various positions around the receiving areas, inventory storage, picking totes, conveyors, packing areas, and shipping areas. One or more additional sensors, such as audio, temperature, acceleration, torque, compression, tension, or the like sensors, can also be disposed non-intrusively at various positions.

Aspect of the present technology will be herein further described with reference to a manufacturing context so as to best explain the principles of the present technology without obscuring aspects of the present technology. However, the present technology as further described below can also be readily applied in health care, warehousing, shipping, retail, restaurants, and numerous other similar contexts.

The cycle and/or action recognition and analytics system 100 can include one or more interfaces 135-165. The one or more interfaces 135-165 can include one or more sensors 135-145 disposed at the one or more stations 105-115 and configured to capture streams of data concerning cycles, processes, actions, sequences, object, parameters and/or the like by the one or more actors 120-130 and/or at the one or more stations 105-115. The one or more sensors 135-145 can be disposed non-intrusively, so that minimal changes to the layout of the assembly line or the plant are required, at various positions around one or more of the stations 105-115. The same set of one or more sensors 135-145 can be disposed at each station 105-115, or different sets of one or more sensors 135-145 can be disposed at different stations 105-115. The sensors 135-145 can include one or more sensors such as video cameras, thermal imaging sensors, depth sensors, or the like. The one or more sensors 135-145 can also include one or more other sensors, such as audio, temperature, acceleration, torque, compression, tension, or the like sensors.

The one or more interfaces 135-165 can also include but are not limited to one or more displays, touch screens, touch pads, keyboards, pointing devices, button, switches, control panels, actuators, indicator lights, speakers, Augmented Reality (AR) interfaces, Virtual Reality (VR) interfaces, desktop Personal Computers (PCs), laptop PCs, tablet PCs, smart phones, robot interfaces, cobot interfaces. The one or more interfaces 135-165 can be configured to receive inputs from one or more actors 120-130, one or more engines 170, and/or other entities. Similarly, the one or more interfaces 135-165 can be configured to output to one or more actors 120-130, one or more engine 170, and/or other entities. For example, the one or more front-end units 190 can output one or more graphical user interfaces to present indications of one or more cycle events, analytics concerning the one or more cycle events, and/or the like on one or more interfaces 165, such displays at one or more stations 105-115, at management portals on tablet PCs, administrator portals at desktop PCs, and/or the like. The one or more front-end units 190 can also receive responses, queries and/or the like on a touch screen display device, keyboard, one or more buttons, microphone and/or the like from one or more actors. Accordingly, the interfaces 135-165 can implement an analysis interface and/or the like of the one or more front-end units 190.

The cycle or action recognition and analytics system 100 can also include one or more engines 170 and one or more data storage units 175. The one or more interfaces 135-165, the one or more sensors 135-145, the one or more engines 170 and the one or more data storage units 175 can be coupled together by one or more networks 192. It is also to be noted that although the above described elements are described as separate elements, one or more elements of the cycle or action recognition and analytics system 100 can be combined together or further broken into different elements.

The one or more engines 170 can include one or more machine learning back-end units 180, one or more analytics units 185, and one or more front-end units 190. The one or more data storage units 175, the one or more machine learning back-end units 180, the one or more analytics units 185, and the one or more front-end units 190 can be implemented on a single computing device, a common set of computing devices, separate computing devices, or different sets of computing devices that can be distributed across the globe inside and outside an enterprise. Aspects of the one or more machine learning back-end units 180, the one or more analytics units 185 and the one or more front-end units 190, and/or other computing units of the cycle recognition and analytics system 100 can be implemented by one or more central processing units (CPU), one or more graphics processing units (GPU), one or more tensor processing units (TPU), one or more digital signal processors (DSP), one or more microcontrollers, one or more field programmable gate arrays and/or the like, and any combination thereof. In addition, the one or more data storage units 175, the one or more machine learning back-end units 180, the one or more analytics units 185, and the one or more front-end units 190 can be implemented locally to the one or more stations 105-115, remotely from the one or more stations 105-115, or any combination of locally and remotely. In one example, the one or more data storage units 175, the one or more machine learning back-end units 180, the one or more analytics units 185, and the one or more front-end units 190 can be implemented on a server local (e.g., on site at the manufacturer) to the one or more stations 105-115. In another example, the one or more machine learning back-end units 135, the one or more storage units 140 and analytics front-end units 145 can be implemented on a cloud computing service remote from the one or more stations 105-115. In yet another example, the one or more data storage units 175 and the one or more machine learning back-end units 180 can be implemented remotely on a server of a vendor, and one or more data storage units 175 and the one or more front-end units 190 can be implemented locally on a server or computer of the manufacturer. In other examples, the one or more sensors 135-145, the one or more machine learning back-end units 180, the one or more front-end unit 190, and other computing units of the cycle recognition and analytics system 100 can perform processing at the edge of the one or more networks 192 in an edge computing implementation. The above examples of the deployment of one or more computing devices to implement the one or more interfaces 135-165, the one or more engines 170, the one or more data storage units 175 and one or more additional data sources 194, are just some of the many different configurations for implementing the cycle recognition and analytics system 100. Any number of computing devices, deployed locally, remotely, at the edge or the like can be utilized for implementing the one or more interfaces 135-165, the one or more engines 170, the one or more data storage units 175, one or more additional data sources 194, or other computing units.

The cycle and/or action recognition and analytics system 100 can also optionally include one or more data compression units associated with one or more of the interfaces 135-165. The data compression units can be configured to compress or decompress data transmitted between the one or more interface 135-165, and the one or more engines 170. Data compression, for example, can advantageously allow the sensor data from the one or more interface 135-165 to be transmitted across one or more existing networks 192 of a manufacturer. The data compression units can also be integral to one or more interfaces 135-165 or implemented separately. For example, video capture sensors may include an integral Motion Picture Expert Group (MPEG) compression unit (e.g., H-264 encoder/decoder). In an exemplary implementation, the one or more data compression units can use differential coding and arithmetic encoding to obtain a 20× reduction in the size of depth data from depth sensors. The data from a video capture sensor can comprise roughly 30 GB of H.264 compressed data per camera, per day for a factory operation with three eight-hour shifts. The depth data can comprise roughly another 400 GB of uncompressed data per sensor, per day. The depth data can be compressed by an algorithm to approximately 20 GB per sensor, per day. Together, a set of a video sensor and a depth sensor can generate approximately 50 GB of compressed data per day. The compression can allow the cycle and/or action recognition and analytics system 100 to use a factory's network 192 to move and store data locally or remotely (e.g., cloud storage).

The cycle and/or action recognition and analytics system 100 can also be communicatively coupled to additional data sources 194, such as but not limited to a Manufacturing Execution Systems (MES), warehouse management system, or patient management system. The cycle and/or action recognition and analytics system 100 can receive additional data, including one or more additional sensor streams, from the additional data sources 194. The cycle and/or action recognition and analytics system 100 can also output data, sensor streams, analytic results and/or the like to the additional data sources 194.

The cycle and/or action recognition and analytics system 100 can continually measure aspects of the real-world, making it possible to describe a context utilizing vastly more detailed data sets, and to solve important business problems like line balancing, ergonomics, and/or the like. The data can also reflect variations over time. The one or more machine learning back-end units 180 can be configured to recognize, in real time, one or more cycles, processes, actions, sequences, objects, parameters and the like in the sensor streams received from the plurality of sensors 135-145. The one or more machine learning back-end units 180 can recognize cycles, processes, actions, sequences, objects, parameters and the like in sensor streams utilizing deep learning, decision tree learning, inductive logic programming, clustering, reinforcement learning, Bayesian networks, and/or the like.

Figure 2:
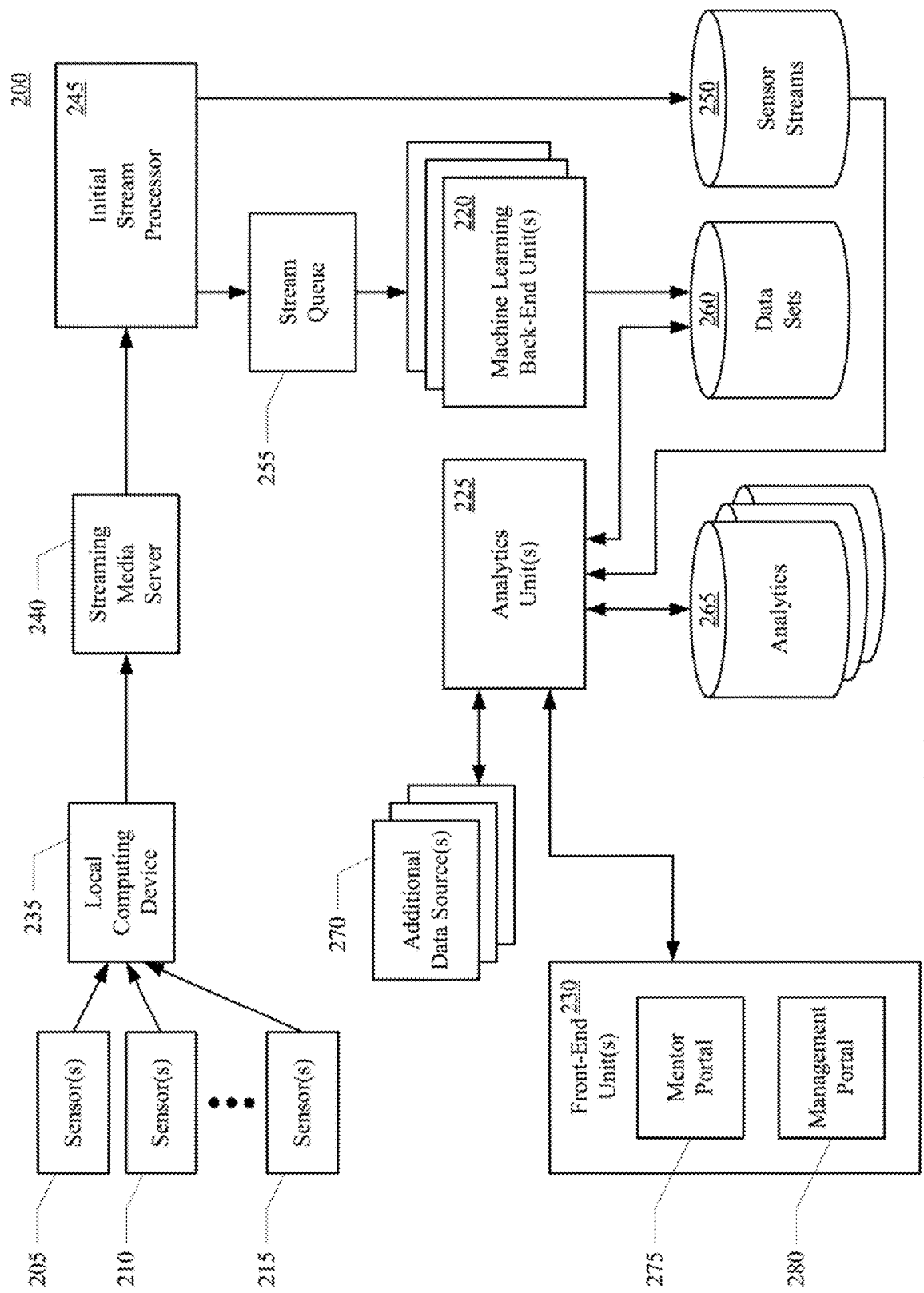
FIG. 2 shows a cycle or action recognition and analytics system, in accordance with aspect of the present technology.

Referring now to FIG. 2, another representation of a cycle recognition and analytics system, in accordance with aspect of the present technology, is shown. Again, the cycle and/or action recognition and analytics system 200 can be deployed in a manufacturing, health care, warehousing, shipping, retail, restaurant, or similar context. The cycle and/or action recognition and analytics system 200 similarly includes one or more sensors 205-215 disposed at one or more stations, one or more machine learning back-end units 220, one or more analytics units 225, and one or more front-end units 230. The system can further include one or more additional subsystems, such as one or more local computing devices 235, one or more streaming media servers 240, one or more initial stream processors 245, one or more stream queues 255, one or more data storage units 250, 260, 265, one or more additional data sources 270, and/or the like. The one or more sensors 205-215 can be coupled to one or more local computing devices 235 configured to aggregate the sensor data streams from the one or more sensors 205-215 for transmission across one or more communication links to a streaming media server 240. The streaming media server 240 can be configured to receive one or more streams of sensor data from the one or more sensors 205-215. An initial stream processor 245 can be coupled to the streaming media server 240 to receive the one or more sensor data streams and convert the sensor data from one format to another. For example, the one or more sensors may generate Motion Picture Expert Group (MPEG) formatted (e.g., H.264) video sensor data, and the initial stream processor 245 can be configured to extract frames of JPEG sensor data. The initial stream processor 245 can also be configured to segment the sensor data into pre-determined chucks, subdivide the chunks into key frame aligned segments, and create per segment sensor data in one or more formats. For example, the initial stream processor 245 can divide the sensor data into five minute chunks, subdivide the chunks into key frame aligned segments, and convert the key frame aligned segments into MPEG, MPEG Dynamic Adaptive Streaming over Hypertext Transfer Protocol (DASH) format, and/or the like. The initial stream processor 245 can be configured to store the sensor stream segments in one or more data structures for storing sensor streams 250. In one implementation, as sensor stream segments are received, each new segment can be appended to the previous sensor stream segments stored in the one or more data structures for storing sensor streams 250.

A stream queue 255 can also be coupled to the initial stream processor 245. The stream queue 255 can be configured to buffer the sensor data from the initial stream processor 245 for processing by the one or more machine learning back-end units 220. The one or more machine learning back-end units 220 can be configured to recognize, in real time, one or more cycles, objects, parameters and the like in the sensor streams received from the plurality of sensors 205-215. The one or more machine learning back-end units 220 can also be configured to recognize processes, actions, sequences and/or the like in the sensor streams.

In one implementation, the one or more machine learning back-end units 220 can recognize cycles, objects, parameters and the like in sensor streams utilizing deep learning, decision tree learning, inductive logic programming, clustering, reinforcement learning, Bayesian networks, and/or the like. The one or more machine learning back-end units 220 can be configured to generate indicators of the one or more cycles, objects, parameters and/or the like. The indicators can include descriptions, identifiers, values and/or the like associated with the cycles, actions, objects, parameters and/or the like. The parameters can include, but are not limited to, time, duration, sensor identifiers, station identifiers, event class and/or the like. The one or more machine learning back-end units 220 can be configured to store one or more data sets including the indicators of the one or more cycles, one or more actions, one or more objects, and one or more parameters for each cycle. The data sets can be stored in one or more data structures for storing the data sets 260. The indicators of the one or more cycles, one or more actions, one or more objects, and one or more parameters in the data sets can be indexed to corresponding portion of the sensor streams in one or more data structures for storing sensor streams 250. In one implementation, the one or more streams of sensor data and the indicators of the one or more cycles, one or more objects and one or more parameters indexed to corresponding portion of the one or more streams of sensor data can be encrypted when stored to protect the integrity of the streams of sensor data and/or the data sets. In one implementation, the one or more streams of sensor data and the indicators of the one or more cycles, one or more objects and one or more parameters indexed to corresponding portion of the one or more streams of sensor data can be stored utilizing blockchaining. The blockchaining can be applied across the cycles, sensor streams, stations, supply chain and/or the like. The blockchaining can include calculating a cryptographic hash based on blocks of the data sets and/or blocks of the streams of sensor data. The data sets, streams of sensor data and the cryptographic hash can be stored in one or more data structures in a distributed network.

The one or more analytics units 225 can be coupled to the one or more data structures for storing the sensor streams 250, one or more data structures for storing the data sets 260, one or more data structures for storing analytics 265, and one or more additional sources of data 270. The one or more analytics units 225 can be configured to perform statistical analysis on determined cycle events, object and parameter data in one or more data sets. The one or more analytics units 225 can also utilize additional data received from one or more additional data sources 270. The additional data sources 270 can include, but are not limited to, Manufacturing Execution Systems (MES), warehouse management system, or patient management system, accounting systems, robot datasheets, human resource records, bill of materials, and sales systems. Some examples of data that can be received from the additional data sources 270 can include, but are not limited to, time, date, shift, day of week, plant, factory, assembly line, sub-assembly line, building, room, supplier, work space, action capability, energy consumption, and ownership cost. The one or more analytics units 225 can be configured to utilize the additional data from one or more additional sources of data 270 to update, correct, extend, augment or the like, the data about the cycles, objects, parameters and/or the like in the data sets. Similarly, the additional data can also be utilized to update, correct, extend, augment or the like, the analytics generate by the one or more analytics units 225. The one or more analytics units 225 can also store trends and other comparative analytics utilizing the data sets and/or the additional data, can use sensor fusion to merge data from multiple sensors, and other similar processing, and store the results in the one or more data structures for storing analytics 265.

The one or more analytics units 225 can also be coupled to one or more front-end units 230. The one or more front-end units 230 can include a mentor portal 275, a management portal 280, and other similar portals. The mentor portal 275 can be configured for presenting feedback generated by the one or more analytics units 225 and/or the one or more front-end units 230 to one or more actors. For example, current cycle time, a current average cycle time and/or the like can be displayed to the worker at a given station to provide real time feedback to the worker. A target cycle time can also be displayed to the worker so that the worker can see their performance. The management portal 280 can be configured to enable searching of the one or more data structures storing analytics, data sets and sensor streams. The management portal 280 can also be utilized to control operation of the one or more analytics units 225 for determining cycle events, generating training content, creating work charts, performing line balancing analysis, assessing ergonomics, creating job assignments, performing causal analysis, automation analysis, presenting aggregated statistics, and the like. For example, the management portal 280 can be utilized to obtain reports of mean cycle time, median cycle time, standard deviation of cycle time for a given station, a given worker, for a given shift, a given date or range of dates, across a set of stations, from a given product configuration, and/or the like that can be utilized to track worker performance, predict how long it takes to satisfy a given order, and/or the like.

The cycle and/or action recognition and analytics system 200 can non-intrusively digitize cycle events, objects, parameters and the like performed by numerous entities, including both humans and machines, using machine learning. The cycle and/or action recognition and analytics system 2 (enables human activity to be measured automatically, continuously and at scale. By digitizing the cycle events, objects, parameters, and the like, the cycle and/or action recognition and analytics system 200 can be utilized to optimize manual and/or automatic processes.

Aspects of the present technology provide novel techniques to develop almost unsupervised neural network models for detecting cycles or action. To detect cycles or actions, video snippets can be passed through a neural network encoder to yield corresponding low dimensional descriptors in a code space. The code points of the low dimensional descriptors are, through an entropy loss function, encouraged to belong to any one of a plurality of class clusters, but discouraged from being between the plurality of class clusters in the code space. Therefore, the code space is configured to make classifying of the cycle or actions easy.

Figure 3:
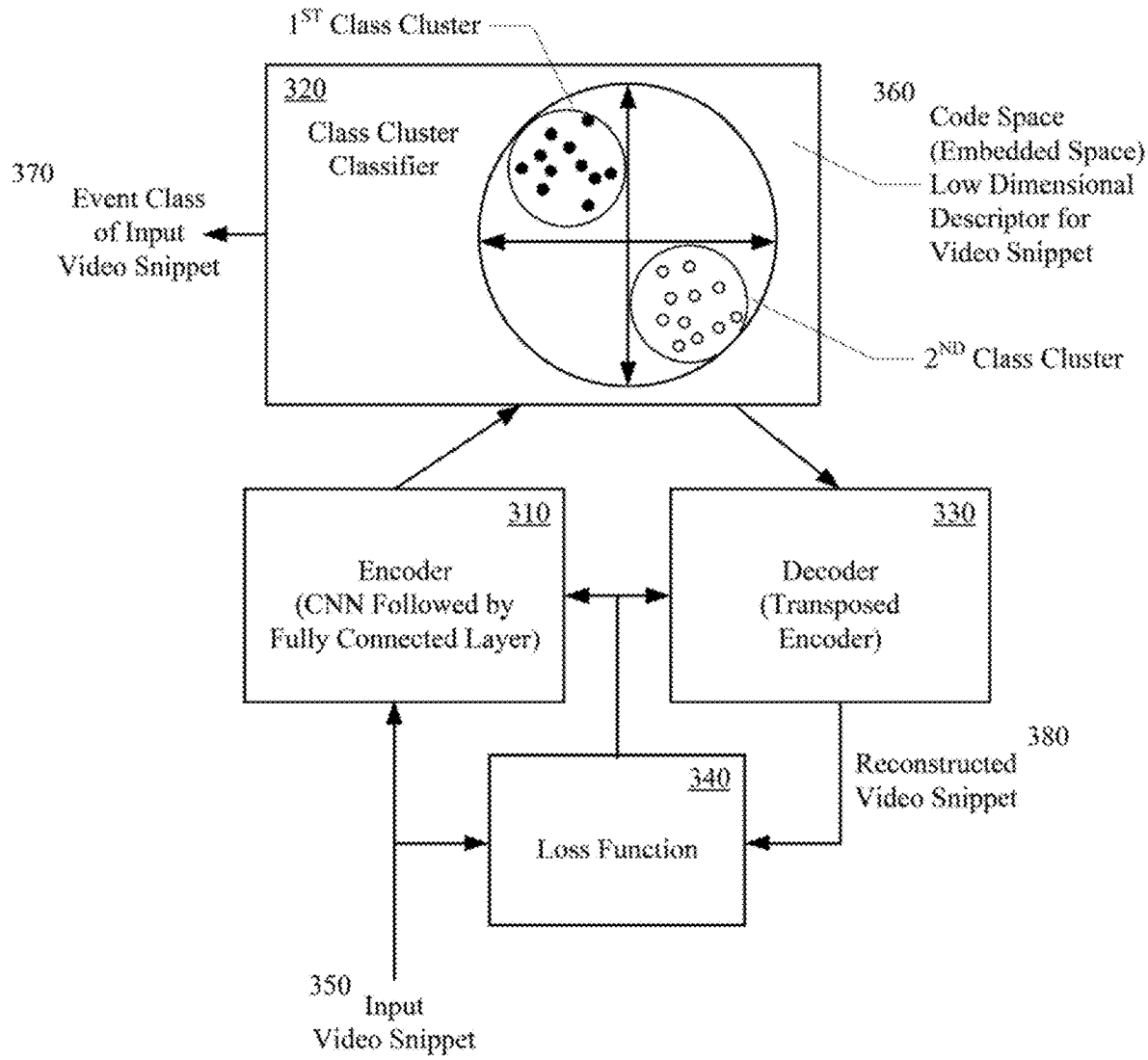
FIG. 3 shows an event detection back-end unit, in accordance with aspects of the present technology.

Referring now to FIG. 3, an event detection back-end unit, in accordance with aspects of the present technology, is shown. The event detection back-end unit 300 can include a neural network encoder 310, a class cluster classifier 320, a neural network decoder 330, and a loss function 340. The neural network encoder 310 can be configured to encode received input video snippets 350 into a low dimensional descriptor of a code space 360. The input video snippets 350 can be labeled video snippets, training video snippets or query video snippets. The class cluster classifier 320 can be configured to build a mapping of the input video snippets 350, event classes for the input video snippets, low dimensional descriptors of the input video snippets 360, and class clusters of the low dimensional descriptors for the input video snippets. The class cluster classifier 320 can also be configured to output an indication of an event class of the query video snippet 370 based on the classified class cluster of the low dimensional descriptor of the query video snippet. The neural network decoder 330 can be configured to decode the low dimensional descriptors of the training video snippets 360 into corresponding reconstructed video snippets 380 for use in adjusting one or more parameters of the neural network encoder 310 and the neural network decoder 330 based on one or more objective functions.

Figure 4A:
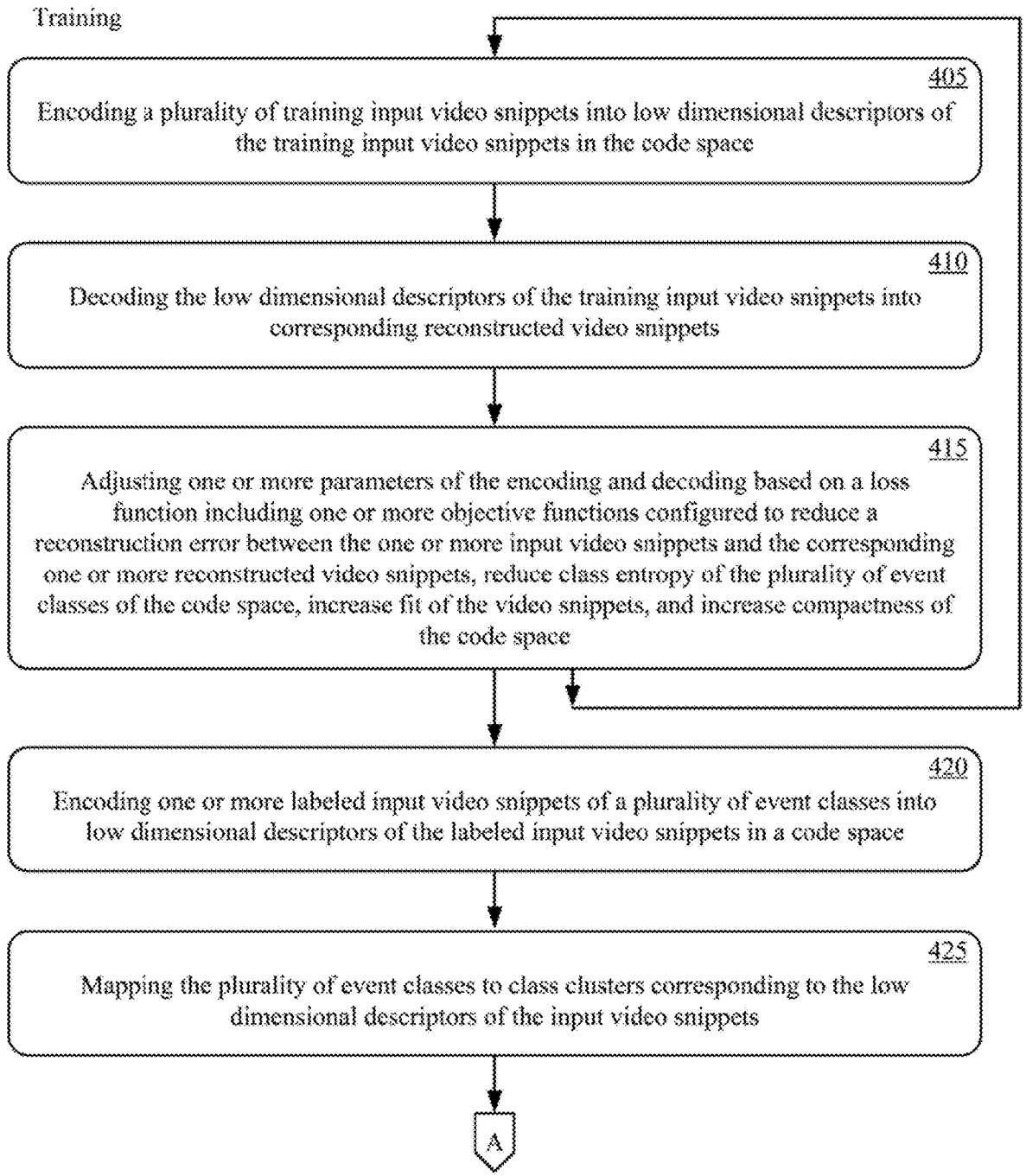
FIGS. 4A and 4B show a method of training and applying the event detection back-end unit, in accordance with aspect of the present technology.
Figure 4B:
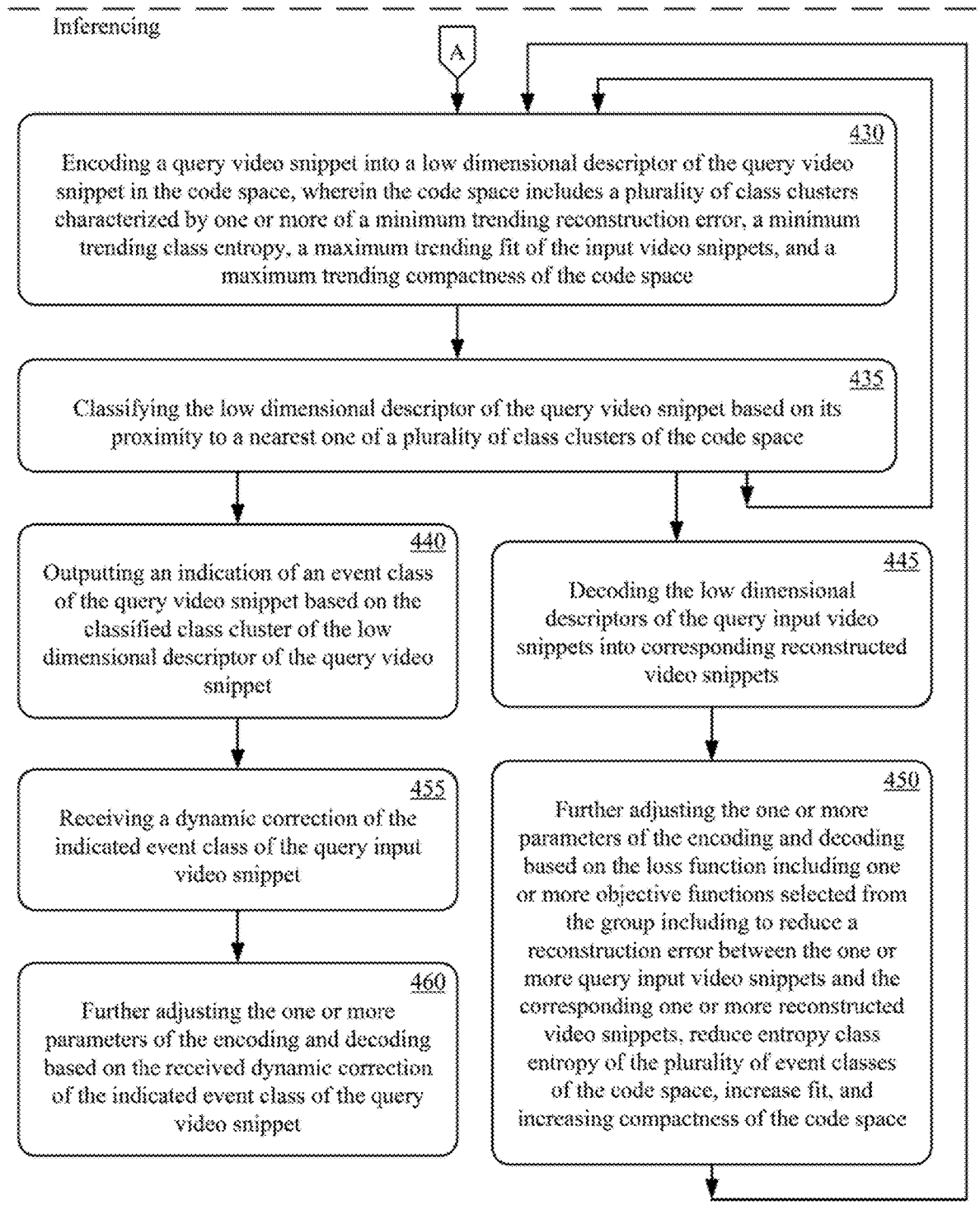

The event detection back-end unit 30 will be further described with reference to FIGS. 4A and 4B, which shows a method of training and applying the event detection back-end unit. The method may be implemented as computing device-executable instructions (e.g., computer program) that are stored in computing device-readable media (e.g., computer memory) and executed by a computing device (e.g., processor).

During a training phase, a plurality of training input video snippets can be encoded into low dimensional descriptors in the code space, at 405. For example, if the event detection comprises detection of cycle events and non-cycle events, a plurality of training input video snippets of cycle events and a plurality of training video snippets of non-cycle events can be encoded by the neural network encoder 310 as low dimensional descriptors of corresponding training input video snippets. In another example, if the event detection comprises detection of a plurality of actions, training input video snippets of the actions can be encoded by the neural network encoded 310 as low dimensional descriptors of the corresponding training input video snippets.

In one implementation, the neural network encoder 310 can include convolution neural network (CNN) followed by a fully connected layer. The encoder can generate a code space wherein each video frame is mapped to a cluster of a corresponding class, based on a comprehensive loss function that includes entropy. For example, a frame containing the unit of manufacture can be mapped to a cluster of the corresponding cycle cluster. A frame that does not contain the unit of manufacture can be mapped to a cluster corresponding to a non-cycle cluster. If the model includes more classes, than the code space can include more corresponding clusters. For example, an action detection model code space can include clusters for each action. The code space, also referred to as the embedding space, provides a low-dimensional descriptor for the video snippet. In one implementation, different model code spaces can be trained and deployed for different sets of classes. For example, a first code space can be trained and deployed for cycle and non-cycle class detection. A second code space can be trained and deployed for detecting the different manufacturing actions. Alternatively, it may be possible to train and deploy a single model code space for two or more different sets of classes. Each cluster should be relatively tight, such that each mapping point in the same cluster are relatively close to each other. However, each cluster should be relatively far away from the other clusters in the code space.

At 410, the low dimensional descriptors of the training input video snippets can be decoded into corresponding reconstructed video snippets. For example, the one or more training input video snippets can be decoded by the neural network decoder 330 into corresponding reconstructed video snippets 380. In one implementation, the neural network decoder 330 can be a transposed CNN. The decoder is a transposed CNN that is configured to reconstruct the video snippet form the latent vector. The decoder can generate a reconstructed video snippet from the code space.

At 415, one or more parameters of the encoding and decoding can be adjusted based on a loss function. The loss function 340 can include one or more objective functions configured to reduce a reconstruction error between the one or more training input video snippets and the corresponding one or more reconstructed video snippets, reduce class entropy of the plurality of event classes of the code space, increase fit of the video snippets, and increase compactness of the code space. In one implementation, the one or more parameters can include one or more weights of the encoder neural network 310 and decoder neural network 330. Typically, the encoder and decoder neural networks 310, 330 include thousands or millions of weights that can be adjusted based on the one or more reconstruction objectives. In addition, other parameters of the encoder and decoder neural networks 310, 330, such as activation functions or the like, can be adjusted based on the objective functions.

During training, the network learns to create a latent coding space which has one or more characteristics, including but not limited to, reduce or minimize class entropy, increase or maximize fidelity, reduce or minimize reconstruction error, increase or maximize fit, compactness, smoothness, continuity, and the like. In minimum class entropy, coding points are encouraged to belong to any one of the class clusters but discouraged from being in the middle (the so called no man's land). In maximal fidelity to the input, visually different images should map to distinct code points, although they may still belong to the same cluster. Fidelity can be ensured by having a decoder network which learns to reconstruct the input from the code space, such that if a video snippet is feed to a fully trained encoder and the output code from the encoder is fed to a fully trained decoder, the decoder output should have minimal difference from the input video snippet. Maximum fit can include maximizing the fit with the evidence (e.g., the training data, but not necessarily labelled). With regard to compactness, coding points can be encouraged to be packed around the origin with a ball of small radius in the code space. For smoothness, continuity, and/or differentiability, nearby code points can be encouraged to correspond to visually similar images.

The loss function and a training regime (depicted below) can incentivize the network (e.g., encoder plus decoder) to reduce class entropy, increase fidelity, reduce reconstruction error, increase fit, increase compactness, increase smoothness, increase continuity and/or the like until a given level of performance is achieved. Aspects of the present technology can employ a probabilistic framework that can include encoding as stochastic sampling with a probability density. The framework can also include encoding as stochastic sampling and differentiability, for back propagation, by using a reparameterization technique. Sampling is not a differentiable process, while backpropagation requires differentiation. The framework can also include estimating the unknown condition probability density function given a small set of training data for each class. The framework can also include minimizing class entropy by defining an objective function such that the embeddings of inputs, belonging to different classes, also belong to different clusters in the latent space.

In one implementation, the processes at 410 through 415 can be repeated for each of the plurality of training input video snippets to build the mapping of the plurality of event classes to class clusters corresponding to the low dimensional descriptors of the input video snippets. The processes at 410 through 415 also build a plurality of class clusters in the code space characterized by one or more of a minimum trending reconstruction error, a minimum trending class entropy, a maximum trending fit of the input video snippets, and a maximum trending compactness of the code space.

Once the encoder and decoder are trained, manually labelled snippets can be encoded and class clusters can be generated in the code space. One or more labeled input video snippets of a plurality of event classes can be encoded into low dimensional descriptors in the code space, at 420. In one implementation, as little as one labeled input video snippet for each event class can be encoded into a corresponding low dimensional descriptor. For example, if the event detection comprises detection of cycle events and non-cycle events, a labeled input video snippet of a cycle event and a labeled input video snippet of non-cycle event can be encoded by the neural network encoder 310 as low dimensional descriptors of the corresponding labeled input video snippets. In another example, if the event detection comprises detection of a plurality of actions, a labeled input video snippet of each action can be encoded by the neural network encoded 310 as low dimensional descriptors of the corresponding labeled input video snippets.

A small number of snippets (e.g., 1-10 cycles) can be provided as examples, wherein examples for all the classes are collected. The small number of snippets of all the classes can constitute the entire labelled data for use in embodiments of the present technology In the same application as described in the background section, as little as one manually labeled video snippet of 30 second may be needed. This is roughly a 212 times reduction in the manual labeling as compared to the conventional fully supervised technique. The reduced manual labelling requirement provides substantially business value by making a significant difference at scale through the reduction of cost, effort and time. Aspects of the present technology significantly reduce or avoid the cost and challenges of acquiring, storing and managing training data sets. Aspects enables the provision of automated results much earlier during client onboarding, wherein a reasonably accurate model can be deployed very quickly while incrementally improving the accuracy with time. In addition, changes in an organizations working style and or environment often results in the need for retraining, which can be done with minimal cost, effort and time. As a result, unit costs can go down by one or more orders of magnitude because of the near-elimination of human labor intensive labelling.

At 425, the plurality of event classes can be mapped to the class clusters corresponding to the low dimensional descriptors of the labeled input video snippets. For example, the cycle event can be mapped to a first class cluster and the non-cycle event can be mapped to a second class cluster in the code space.

During inferencing, query video snippets can be encoded, and classified based on their proximity to one or another class cluster (e.g., it can get the label of the nearest cluster). Accordingly, aspects of the present technology can belong to the metric learning paradigm. The query video snippets can be encoded into low dimensional descriptors of the query video snippets in the code space, at 430. For example, if the event detection comprises detection of cycle events and non-cycle events, query input video snippets of cycle and/or non-cycle events can be encoded by the neural network encoder 310 as low dimensional descriptors of corresponding query input video snippets. In another example, if the event detection comprises detection of a plurality of actions, query input video snippets of the actions can be encoded by the neural network encoded 310 as low dimensional descriptors of the corresponding query input video snippets.

At 435, the low dimensional descriptor of the respective query video snippets can be classified based on its proximity to a nearest one of the plurality of class clusters of the code space. For example, the class cluster classifier 320 can infer class type of each query video snippet based on its corresponding low dimensional descriptor proximity to a nearest one of the plurality of class cluster of the code space from the mapping of the plurality of event classes to class clusters corresponding to the low dimensional descriptors of the input video snippets.

Once trained, during inference, for each video frame that passes through the encoder it is determined if the mapping point is within a given cluster. For example, during inference operation, if a given video frame maps to a point within the cycle class cluster, the given video frame can be identified as a manufacturing cycle frame. If the video frame maps to a point within the non-cycle class cluster, the video frame can be identified as a non-cycle frame.

At 440, an indication of an event class of the query video snippet can be output based on the classified class cluster of the low dimensional descriptor of the query input video snippet. For example, if a low dimensional descriptor of a query input video snippet is classified as belonging to a cycle class cluster, an indication that the given query input video snippet is a cycle event can be output 370 by the class cluster classifier 320. If the low dimensional descriptor of the query input video snippet is classified as belonging to a non-cycle class cluster, an indication that the given query input video snippet is a non-cycle event can be output 370. The indicators of the event classes of the query video snippets can be indexed to corresponding portion of the sensor streams in one or more data structures for storing sensor streams 250.

Optionally, the query video snippets can also be utilized to further train the event detection back-end unit 300. For instance, the low dimensional descriptors of the query input video snippets can be decoded into corresponding reconstructed video snippets, at 445. For example, the query input video snippets can be decoded by the neural network decoder 330 into corresponding reconstructed video snippets 380. At 450, one or more parameters of the encoding and decoding can be further adjusted based on a loss function. Furthermore, the processes at 430 through 450 can be repeated for each received query video snippet.

Optionally, the event detection back-end unit 300 can receive corrections to the determined events. For instance, a dynamic correction of the indicated event class of the query input video snippet can be received, at 455. At 460, the one or more parameters of the encoding and decoding can be further adjusted based on the received dynamic correction of the indicated event class of the query video snippet.

The loss function 340 can be described in accordance with a probabilistic framework. For encoding as stochastic sampling, a set of unlabeled training inputs can be represented as $X=\{\vec{x}_1, \vec{x}_2, \ldots, \vec{x}_N\}$, wherein each input $\vec{x}_i$ is a sequence of one or more video frames. A code vector in the lower dimensional latent space can be denoted as $\vec{z}$. Encoding, which is a mapping from the input vector to the latent vector $\vec{x} \rightarrow \vec{z}$ can be depicted as a stochastic sampling process with a probability density $p(\vec{z}|\vec{x}1)$. Posing the mapping from the input vector to the latent vector $\vec{x} \rightarrow \vec{z}$ as a stochastic processes creates a latent space that is more continuous. Therefore, if the same input $\vec{x}$ is encoded many times, the input $\vec{x}$ can potentially be mapped to slightly different latent code vectors $\vec{z}$ every time. By forcing all of the neighboring latent code vector values $\vec{x}$ to reconstruct to the same input, the network is essentially taught that neighboring points in the latent space are maps of the same input. If there are multiple epochs in training, each epoch will deal with a slightly different latent code vector $\vec{z}$, and greater continuity in the latent space can be obtained.

The encoding process can be illustrated by considering the unknown probability distribution as a multi-variate Gaussian. Accordingly, the probailidensity can be represented as $p(\vec{z}|\vec{x}) = \mathcal{N}(\vec{\mu}(\vec{x}), \Sigma(\vec{x}))$ wherein $\mathcal{N}(\vec{\mu}, \Sigma)$ denotes a multi-variate Gaussian with mean µ and co-variance matrix Σ. The parameters of the Gaussian are functions of the input, and each input $\vec{x}$ maps to a small Gaussian neighborhood in the latent space of the code vector $\vec{z}$. The decoder will map the given code vector $\vec{z}$ back to (e.g., reconstruct) the same input $\vec{x}$, thereby bringing continuity to the latent space.

During training, a given input can be encoded to generate the mean $\vec{\mu}(\vec{x})$ and co-variance matrix $\Sigma(\vec{x})$. The mean $\vec{\mu}(\vec{x})$ and co-variance matrix $\Sigma(\vec{x})$ can be sampled to generate the latent code vector $\vec{z}$. The latent code vector $\vec{z}$ can be decoded to generate a reconstructed version of the input $\hat{\vec{x}}$. The encoder and decoder neural networks can then be trained to optimize one or more objectives. The objectives can include minimizing the reconstruction error, minimizing class entropy, maximizing fit and/or maximizing compactness. As used herein the terms optimize, minimize and maximize are intended to refer to the convergence of the neural network towards a network state where the network has learned to respond to a set of training patterns within some margin of error, amount of time, amount of computation and/or the like, and not an absolute optimum, minimum or maximum value. The reconstruction error can be minimized based on the square of the absolute difference between the input and the output $\|\vec{x} - \hat{\vec{x}}\|^2$. Minimizing the class entropy refers to the distribution of the latent code vector $\vec{z}$ being multi-modal, with as many modes as there are event classes. For example, in a cycle detector there can be two classes which a frame can belong to. The first class can be InCycle and the second class can be NotInCycle, for example. For action detection, there can be a separate class for each action. Maximizing fit with the evidence can include maximizing the probability of the training data inputs. Maximizing the compactness of the space can include trying to fit the distribution to a zero-mean unit variance Gaussian prior. This has the overall effect of keeping most of the latent code vector $\vec{z}$ values within a unit radius ball around the origin.

There is a complication with encoding as stochastic sampling in that the sampling process is not a differentiable process, which is needed for backpropagation (e.g., decoding). However, differentiability can be achieved by reparameterization. With regard to reparameterization, sampling from a normal distribution $\mathcal{N}(\vec{\mu}(\vec{x}), \Sigma(\vec{x}))$ can be equivalent to sampling from a zero-mean unit variance normal distribution, scaling it up by σ and translating by µ to give $\mathcal{N}(\mu, \sigma) = \mu + \sigma \mathcal{N}(0,1)$. This idea can also be extended to high dimensions for a multi-variate normal to give $\mathcal{N}(\vec{\mu}, \Sigma) = \vec{\mu} + \Sigma \mathcal{N}(\vec{0}, I)$. Therefore, a sampling from a multi-variate Gaussian can be simulated in two steps that include generating $\vec{\mu}(\vec{x})$ and $\Sigma(\vec{x})$ from running the input $\vec{x}$ through the encoder, and sampling from a zero-mean unit variance matrix, and scaling and translating the sample. Note that the sampling process is now independent of the input $\vec{x}$. Accordingly, the input does not take part in the backpropagation. This de-coupling allows backpropagation through the encoder even though sampling is not differentiable.

For estimating the unknown condition probability density, the encoding can be described as a stochastic sampling from $p(\vec{z}|\vec{x})$. However, the function $p(\vec{z}|\vec{x})$ is not known, just the training data X is known. As discussed in the context of reparameterization, the encoder neural network can generate the parameters of the multi-variate Gaussian that can be used to sample the latent vector. The weights of the encoder and decoder neural networks can be learned so as to optimize the one or more objectives, including minimizing reconstruction error, maximizing evidence fit, maximizing compactness and minimizing class entropy. Estimating the unknown condition probability density function can be solved, following the principal of variational inferencing, by approximating the unknown $p(\vec{z}|\vec{x})$ with a function $q(\vec{z}|\vec{x})$ belonging to the theta friendly multi-variate Gaussian family.

As used herein the set of all parameters of the Gaussian approximator $\{\vec{\mu}, \vec{\sigma}\}$ to the neural network encoder is denoted as θ. When appropriate, the Gaussian approximator will be denoted as $q(\vec{z}|\vec{x}; \theta)$, with the parameters θ explicitly mentioned. However, the parameters at times may be omitted herein, and instead the Gaussian approximator will be denoted as $q(\vec{z}|\vec{x})$, which is equivalent. For the sake of brevity, the parenthesized parts may even be dropped, such that $p(\vec{z}|\vec{x})$ is denoted as p, and $q(\vec{z}|\vec{x})$ or $q(\vec{z}\vec{x}; \theta)$ is denoted as q, and so on.

As per usual practice in variational inference, $q(\vec{z}|\vec{x})$ is a member of the Gaussian family, wherein σ is the mean and Σ is the co-variance matrix. Furthermore, the co-variance matrix Σ can be a diagonal matrix $$\sum = \begin{bmatrix} \sigma_1 & 0 & 0\ldots & 0 \\ 0 & \sigma_1 & 0\ldots & 0 \\ \vdots & \vdots & \vdots\ldots & \vdots \\ 0 & 0 & 0 & \ldots & \sigma_N \end{bmatrix} = \vec{\sigma}^T I$$

where $\vec{\sigma}^T = [\sigma_1, \sigma_2 \ldots \sigma_N]$ and I denote the identity matrix. It is desired for $q(\vec{z}|\vec{x})$ to be as close as possible to $p(\vec{z}|\vec{x})$. In probability terms, it is desired for the Kullback-Leibler (KL) Divergence between the two distributions to be minimized such that $$KLD\left(q(\vec{z}|\vec{x};\theta)\right),$$

$$p(\vec{z}|\vec{x}) = \int_{\vec{z}} q\ln\left(\frac{p}{q}\right)d\vec{z} = \int_{\vec{z}} q\ln(q)d\vec{z} - \int_{\vec{z}} q\ln(p(\vec{z}|\vec{x}))d\vec{z} = \int_{\vec{z}} q\ln(q)d\vec{z} -$$

$$\int_{\vec{z}} q\ln\left(\frac{p(\vec{z}|\vec{x})}{p(\vec{x})}\right)d\vec{z} = \int_{\vec{z}} q\ln(q)d\vec{z} - \int_{\vec{z}} q\ln(p(\vec{z}|\vec{x}))d\vec{z} + \ln(p(x))\int_{\vec{z}} qd\vec{z}$$

Since Q is a probability density function, $\int_{\vec{z}} qd\vec{z} = 1$. Hence, $$KLD(q(\vec{z}|\vec{x};\theta),p(\vec{z}|\vec{x})) + ELBO = \ln(p(x))$$

where $$ELBO = -\int_{\vec{z}} q\ln(q)d\vec{z} + \int_{\vec{z}} q\ln(p(\vec{z}|\vec{x}))d\vec{z}$$

and ELBO stands for evidence lower bound. Again, the objective is to minimize the KLD by varying $\theta$. The term $\ln(p(x))$ is constant with respect to $\theta$. In other words, $$KLD + ELBO = \text{constant}$$

Thus, minimizing KLD is equivalent to maximizing ELBO. Therefore, the simplified objective now stands as maximizing ELBO.

The training data set x is called the evidence. Thus, $\ln(p(x))$ measures the probability evidence. Now, KLD cannot be negative. Hence, from the equation $\ln(p(x)) = KLD + ELBO$, it can be seen that the lower bound for $\ln(p(x))$ is ELBO, which explains the name.

Examining the ELBO expression more closely $$ELBO = -\int_{\vec{z}} q\ln(q)d\vec{z} + \int_{\vec{z}} q\ln(p(\vec{z}|\vec{x}))d\vec{z}$$

the first term is in fact the entropy of q, which measures the uncertainty in q. The more diffuse the point distribution, the more the entropy. In addition, the second term is the expected value of $\ln(p(x))$ under the distribution $q(\vec{z}|\vec{x})$. Thus, $$ELBO = \text{entropy}(q) + E_q(p(\vec{z}|\vec{x}))$$

Maximizing ELBO is thus equivalent to making q more diffuse (e.g., prevent tall peaks). From the entropy term, putting more mass in q where the joint distribution $p(\vec{z}|\vec{x})$ is high. In other words, maximizing ELBO aligns q better with $p(\vec{z}|\vec{x})$.

Examining the ELBO expression some more $$ELBO = -\int_{\vec{z}} q\ln(q)d\vec{z} + \int_{\vec{z}} q\ln(p(\vec{z}|\vec{x}))d\vec{z} =$$

$$-\int_{\vec{z}} q\ln(q)d\vec{z} + \int_{\vec{z}} q\ln(p(\vec{x}|\vec{z}))p(\vec{z})d\vec{z} = \int_{\vec{z}} q\ln(p(\vec{x}|\vec{z}))d\vec{z} - \int_{\vec{z}} q\ln\left(\frac{p}{q(\vec{z})}\right)d\vec{z}$$

Thus, $$ELBO = \int_{\vec{z}} q\ln(p(\vec{z}|\vec{x}))d\vec{z} - \int_{\vec{z}} q\ln\left(\frac{p}{q(\vec{z})}\right)d\vec{z} = E_q(p(\vec{z}|\vec{x})) - KLD(p(\vec{z}|\vec{x}), p(\vec{z}))$$

The last expression is significant in that the first term is the expected value of $p(\vec{x}|\vec{z})$ under the distribution q, $E_q(p(\vec{z}|\vec{x}))$. The decoder generates a reconstructed output z from the latent vector $\vec{z}$. Maximizing $E_q(p(\vec{z}|\vec{x}))$ is equivalent to minimizing the reconstruction error from the decoder. The second term is the negative of the KL Divergence between the approximator q and the prior distribution $p(\vec{z})$. Maximizing this is equivalent to minimizing the KL Divergence. A prior distribution can be chosen that imposes an overall shape to the distribution q. In this approach $p(\vec{z}) = \mathcal{N}(\vec{0}, I)$ can be used. This prior distribution imposes a constraint on the approximator q that its points are encouraged to lie within a unit radius ball around an origin. From $q(\vec{z}|\vec{x}) = \mathcal{N}(\vec{\mu}, \vec{\sigma}^T I)$ and $p(\vec{z}) = \mathcal{N}(\vec{0}, I)$, $KLD(q(\vec{z}|\vec{x}), p(\vec{z})) = \frac{1}{2}\Sigma_{i \in D}(\mu_i^2 + \sigma_i^2 - \ln(\sigma_i^2) - 1$, where D is the dimensionality of the later space. A simple interpretation of this objective function is that it encourages the components of the mean to stay close to zero and the components of the variance to stay close to 1.

A small amount of training data can be manually curated for each event class. Thus, for cycle detection, each incoming frame can belong to one or two possible classes, InCycle or NoInCycle. For action detection, there can be as many classes as actions. It is desired for the latent space to be such that each class forms a distinct cluster in the latent space. In other words, embeddings (e.g., latent vectors, latent codes, encodings) of inputs, belonging to different classes, also belong to different clusters in the latent space. In this situation, an object function can be defined to encourage clustering.

For anchors to minimize class entropy, let C be the number of classes. In one implementation, there can be C set of manually classified video snippets, which can be referred to as anchor sets. The $i^{th}$ anchor set corresponds to class i, which can also be states as the $i_{th}$ anchor set has label i. The number of elements in the set can be denoted as $N_i$. Therefore, the $i^{th}$ anchor set can be denoted as $A_i = \{\vec{x}_{i,1}, \ldots, \vec{x}_{i,N_i}\}$.

Just like other inputs, anchor inputs $\vec{x}_{i,j}$ are also encoded. The same encoder neural network can be used to encode anchors and non-anchor points. Each anchor input, when encoded maps to a specific point in the latent space. The output of encoder network $\vec{\mu}_{i,j}, \vec{\sigma}_{i,j}$ can be denoted as on the anchor point $\vec{x}_{i,j}$.

Consider an arbitrary training input $\vec{x}$, it is desired for the latent space to be such that the encoder output $\mu(\vec{x})$ is close to exactly one of the class clusters $A_i$. The soft nearest neighbor concept can be used to measure the proximity of $\mu(\vec{x})$ to the anchor output $\vec{\mu}_{i,j}$. Accordingly, the expression for that approximation is $$p_{i,j}(\vec{x}) = \frac{e^{-\|\mu(\vec{x}) - \vec{\mu}_{i,j}\|^2}}{\sum_{(s,t) \in \text{all anchors}} e^{-\|\mu(\vec{x}) - \vec{\mu}_{i,j}\|^2}}$$

Furthermore, the above proximity is a probability. In fact, $p_{i,j}(\vec{x})$ is the probability that input vector $\vec{x}$ maps to the anchor point i, j.

The probability that input vector $\vec{x}$ maps to the class i cluster can be obtained by summing over all examples of that class $$p_i(\vec{x}) = \Sigma_{j \in A_i} p_{i,j}(\vec{x})$$

Alternatively, the probability can be defined $$p_i(\vec{x}) = \frac{e^{-\|\mu(\vec{x}) - \vec{\mu}_i\|^2}}{\sum_{k \in \text{ all clusters}} e^{-\|\mu(\vec{x}) - \vec{\mu}_k\|^2}}$$

wherein $$u_i = \frac{1}{N_i} \sum_j \vec{\mu}_{i,j}$$

denotes the centroid of the $i^{th}$ example cluster. In either formulation, the probability that the input vector $\vec{x}$ maps to the class i cluster should be high for only a single i and low for all other i's. This is equivalent to saying that the class entropy C is minimal where $$C(\vec{x}) = -\Sigma_{i \in c} p_i(\vec{x}) \ln(p_i(\vec{x}))$$

Thus, the objective function includes a term $C(\vec{x})$ to be minimized.

The overall loss function for training the encoder and decoder therefore can be $$\mathcal{L}(\vec{x}) = \lambda_1 \|\hat{\vec{x}} - \vec{x}\|^2 + \frac{1}{2} \Sigma_{i \in D} (\mu_i^2 + \sigma_i^2 - \ln(\sigma_i^2) - 1) + \lambda_2 C(\vec{x})$$

where $\|\hat{\vec{x}} - \vec{x}\|^2$ is the reconstructed loss, $\frac{1}{2} \Sigma_{i \in D} (\mu_i^2 + \sigma_i^2 - \ln(\sigma_i^2) - 1)$ is the KL Divergence from zero-mean-unit-variance Gaussian prior, and $C(\vec{x})$ is the class entropy.

Figure 5:
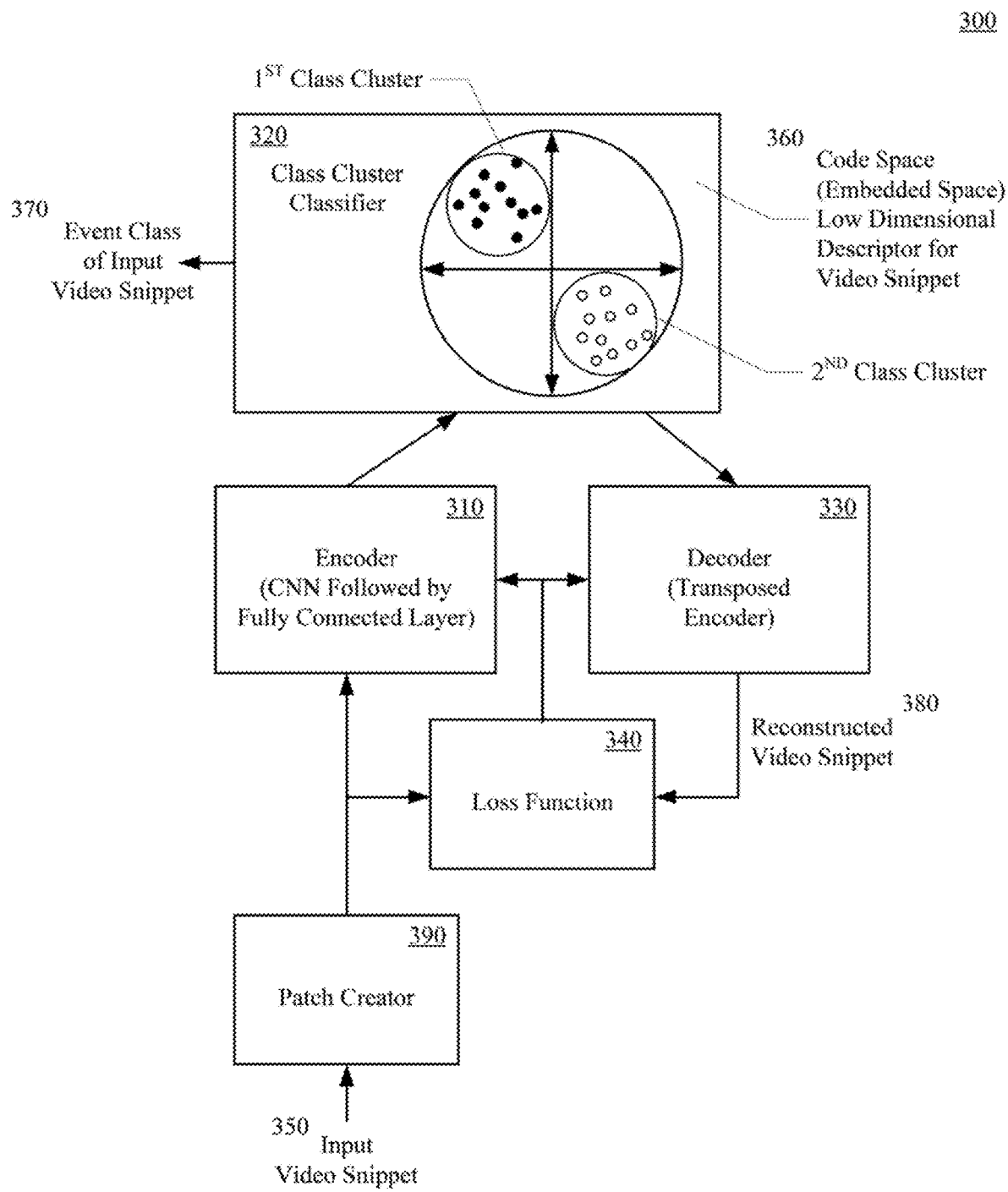
FIG. 5 shows an event detection back-end unit, in accordance with aspects of the present technology.
Figure 6:
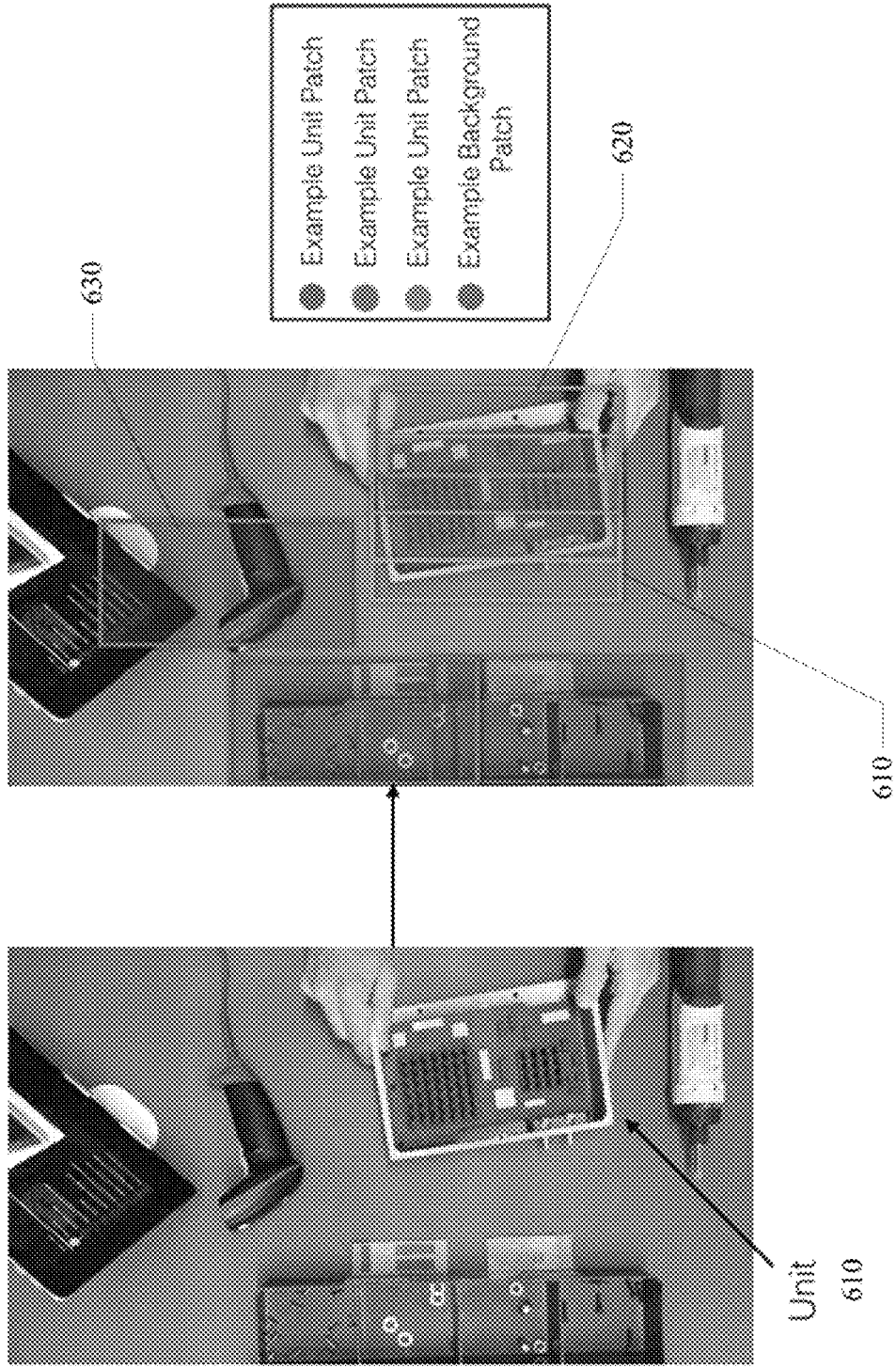
FIG. 6 illustrates an event detection process, in accordance with aspects of the present technology.

The event detection back-end unit can work better when the foreground (e.g., region of interest) is relatively large. For example, during cycle detection, if an article of manufacture (e.g., unit) is too small in the video, the encoder and class cluster classifier may ignore it and only match the background. The penalty incurred by ignoring the background is negligible owing to the relatively small area of the foreground. Furthermore, the encoder becomes very sensitive to the exact position of the foreground in the image. Referring now to FIG. 5, an event detection back-end unit, in accordance with further aspects of the present technology, is shown. The event detection back-end unit 3M) can further include a patch creator 390. As further illustrated in FIG. 6, the patch creator can be configured to subdivide the entire image in a video snippet 350 into a set of small patches (e.g., rectangles) 610-630. The patches 610-630 can and do typically overlap. Instead of encoding and decoding the entire image, the patches 610-630 are encoded and decoded. Anchor patches can be created programmatically. For each patch, the foreground object that has the highest overlap with the patch can be identified. The identified patch can be labelled with the same foreground object. If the patch does not overlap any foreground object it can be labeled as background. Since the patch size is not much bigger than the foreground size, the foreground cannot be ignored in a patch. Furthermore, the event detection back-end unit 300 can be adjusted to be more or less robust to the location of the foreground in the video frame.

Figure 7:
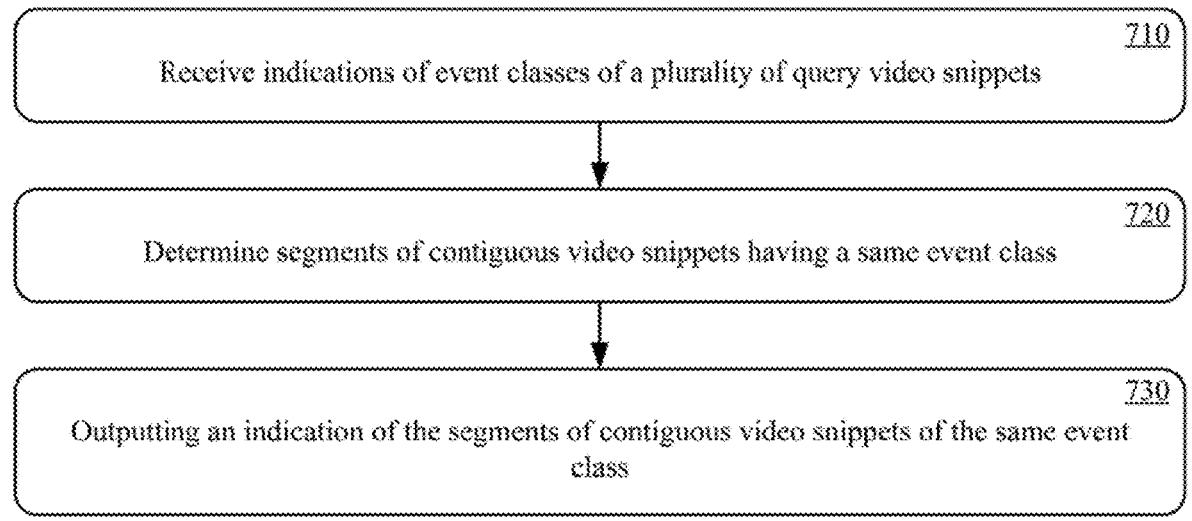
FIG. 7 a method of classifying video segments, in accordance with aspects of the present technology.
Figure 8:
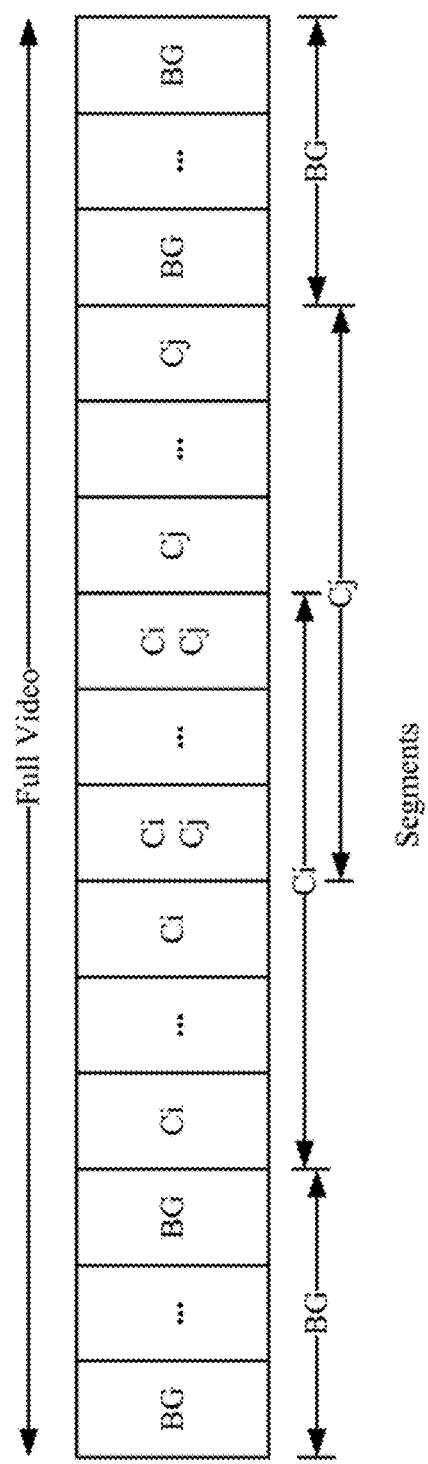
FIG. 8 shows a classification of video snippets into video segments, in accordance with aspects of the present technology.

Referring now to FIG. 7, a method of classifying video segments, in accordance with aspects of the present technology, is shown. The method of classifying video segments will be further explained with reference to FIG. 8, which illustrates classification of video snippets into video segments. The method of classifying vide segments can include receiving indications of event classes of a plurality of video snippets, at 710. For example, the class cluster classifier 320 can determine event classes of a plurality of video snippets based on the classified class cluster of the low dimensional descriptor of the video snippets. The plurality of video snippets can include identifiers ofa background (BG) class, a Ci class, and a Cj class. In one implementation, the identifiers can be frame tags. Snippets can be identified as belonging to one or more event classes.

At 720, segments of contiguous video snippets having the same event class can be determined. For example, a first set of contiguous video snippets can be determined to have the same background (BG) class, a second set of contiguous video snippets can be determined to have the same Ci class, a third set of contiguous video snippets can be determined to have the same Cj class, and a fourth set of contiguous video snippets can be determined to have the same background (BG) class. In addition, some contiguous video snippets can be associated with multiple classes. For example, some contiguous video snippets can both have the Ci and Cj classes. Accordingly, although video snippets do not overlap, the segments can overlap.

At 730, an indication of the segments of contiguous query video snippets of the same event class can be output. Accordingly, video snippets can be joined into segments with the segments receiving the classification of the contiguous set of video snippets therein. In one implementation, the output can include outputting one or more segments of one or more the event classes. In another implementation, the output can include applying a tag indicating the corresponding event class belongs to the corresponding segment of contiguous video snippets. In another implementation, the output can include mapping the indication of the segments of contiguous video snippets to the corresponding video snippets.

Figure 9:
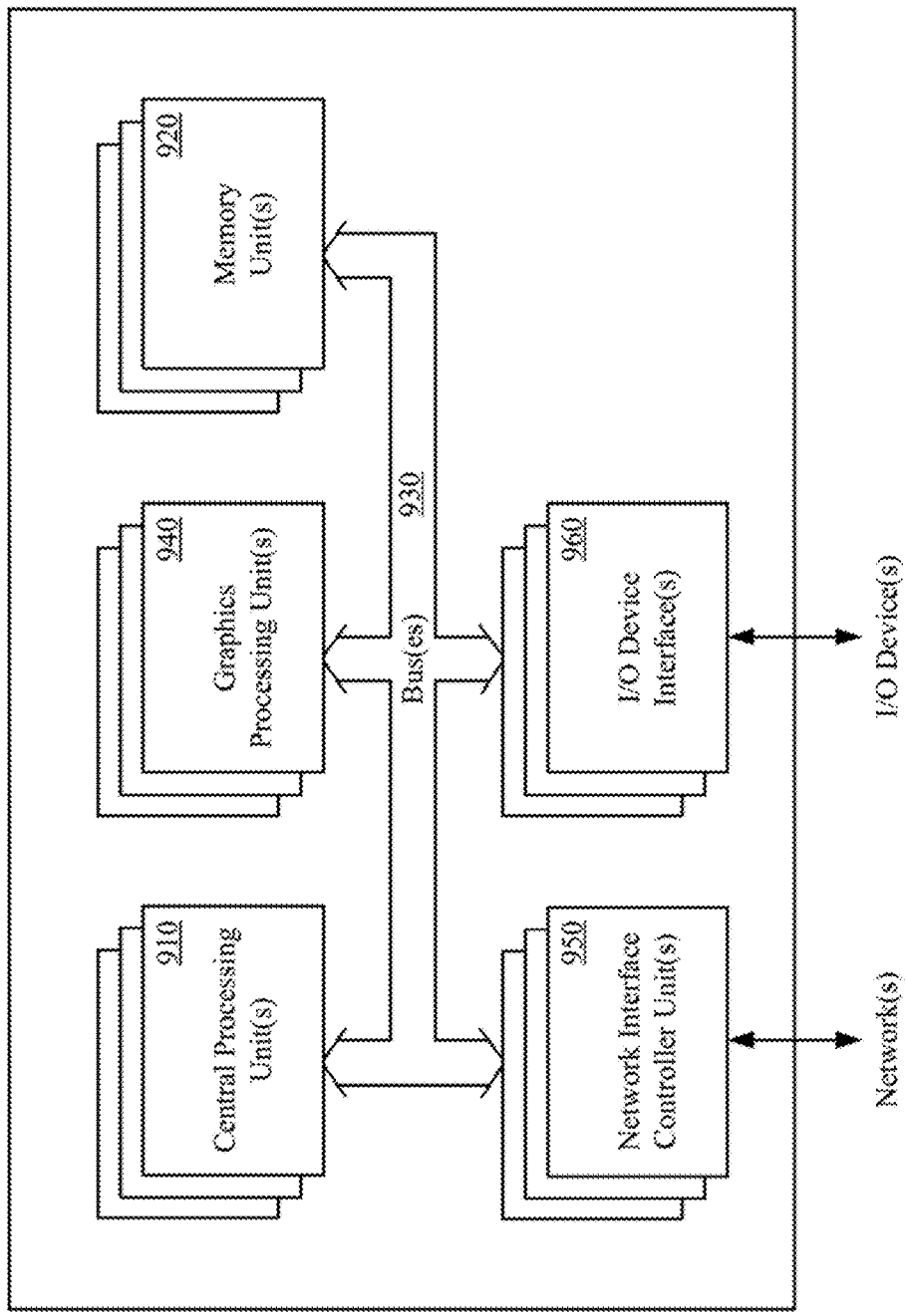
FIG. 9 illustrates an exemplary computing device upon which various aspects of the present technology can be implemented.

Referring now to FIG. 9, a block diagram of an exemplary computing device upon which various aspects of the present technology can be implemented. In various embodiments, the computer system 900 may include a cloud-based computer system, a local computer system, or a hybrid computer system that includes both local and remote devices. In a basic configuration, the system 900 includes at least one processing unit 910 and memory 920 communicatively coupled by one or more buses 930. The system 900 may also have additional features and/or functionality. For example, the system 900 may include one or more Graphics Processing Units (GPUs) 940. Additionally, the system 900 may also include additional storage (e.g., removable and/or non-removable) including, but not limited to, magnetic or optical disks or tape.

The system 900 may also contain network interface controller units 950 that allow the device to communicate with other devices, e.g., in a networked environment using logical connections to one or more remote computers. Furthermore, the system 900 may also include one or more input/output (I/O) devices 960 such as, but not limited to, a voice input device, touch input device, keyboard, mouse, pen, touch input display device, a display device, speakers, printer, and/or the like.

In the example of FIG. 9, the memory 920 includes computer-readable instructions, data structures, program modules, and the like associated with one or more various embodiments of the present technology. However, the embodiment(s) may instead reside in any one of the computer storage media used by the system 900, or may be distributed over some combination of the computer storage media, or may be distributed over some combination of networked computers, but is not limited to such.

It is noted that the computing system 900 may not include all of the elements illustrated by FIG. 9. Moreover, the computing system 900 can be implemented to include one or more elements not illustrated by FIG. 9. It is pointed out that the computing system 900 can be utilized or implemented in any manner similar to that described and/or shown by the present disclosure, but is not limited to such.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. An event detection method comprising:
   receiving a query video snippet;
   encoding the query video snippet into a low dimensional descriptor of a code space, wherein the code space includes a plurality of class clusters characterized by one or more of a minimum trending reconstruction error, a minimum trending class entropy, a maximum trending fit of video snippets and a maximum trending compactness of the code space;
   classifying the low dimensional descriptor of the query video snippet based on its proximity to a nearest one of a plurality of class clusters of the code space; and
   outputting an indication of an event class of the query video snippet based on the classified class cluster of the low dimensional descriptor of the query video snippet.

2. The event detection method of claim 1, wherein the low dimensional descriptors are encouraged to belong to any one of a plurality of class clusters, but discouraged from being between the plurality of class clusters in the code space.

3. The event detection method of claim 2, wherein the event classes include a cycle class and a not cycle class.

4. The event detection method of claim 2, wherein the event classes include a plurality of action cycle classes.

5. The event detection method of claim 1, wherein the plurality of class clusters are mapped to corresponding event classes.

6. The event detection method of claim 1, further comprising:
   encoding a plurality of training video snippets into low dimensional descriptors of the training video snippets in the code space;
   decoding the low dimensional descriptors of the training video snippets into corresponding reconstructed video snippets; and
   adjusting one or more parameters of the encoding and decoding based on a loss function including one or more objective functions selected from a group including to reduce a reconstruction error between the one or more training video snippets and the corresponding one or more reconstructed video snippets, to reduce entropy class entropy of the plurality of event classes of the code space, to increase fit (of the training video snippet), and to increase compactness of the code space.

7. The event detection method of claim 6, further comprising:
   encoding one or more labeled video snippets of a plurality of event classes into low dimensional descriptors of the labeled video snippets in the code space; and
   mapping the plurality of event classes to class clusters corresponding to the low dimensional descriptors of the labeled video snippets.

8. The event detection method of claim 6, further comprising:
   decoding the low dimensional descriptors of the query video snippets into corresponding reconstructed video snippets; and
   further adjusting the one or more parameters of the encoding and decoding based on the loss function.

9. The event detection method of claim 1, further comprising:
   receiving indications of event classes of a plurality of query video snippets;
   determining segments of contiguous video snippets having a same event class; and
   outputting an indication of the segments of contiguous video snippets of the same event classes.

10. A event detection method comprising:
    encoding a plurality of training video snippets into low dimensional descriptors of the training video snippets in a code space, including one or more labeled video snippets of a plurality of event classes;
    mapping the plurality of event classes to class clusters corresponding to the low dimensional descriptors of the labeled video snippets;
    decoding the low dimensional descriptors of the training video snippets into corresponding reconstructed video snippets; and
    adjusting one or more parameters of the encoding and decoding based on a loss function including one or more objective functions selected from a group including to reduce a reconstruction error between the one or more training video snippets and the corresponding one or more reconstructed video snippets, to reduce a class entropy of the plurality of event classes of the code space, to increase fit of the training video snippet, and to increase compactness of the code space.

11. The event detection method of claim 10, wherein the low dimensional descriptors are encouraged to belong to any one of a plurality of class clusters, but discouraged from being between the plurality of class clusters in the code space.

12. The event detection method of claim 10, wherein the plurality of event classes include a cycle class and a not cycle class.

13. The event detection method of claim 10, wherein the plurality of event classes include a plurality of action cycle classes.

14. An event detection device comprising:
a neural network encoder configured to encode a query video snippet into a low dimensional descriptor of a code space, wherein the code space includes a plurality of class clusters characterized by one or more of a minimum trending reconstruction error, a minimum trending class entropy, a maximum trending fit of video snippets and a maximum compactness of the code space; and
a class cluster classifier configured to classify the low dimensional descriptor of the query video snippet based on its proximity to a nearest one of a plurality of class clusters of the code space and output an indication of an event class of the query video snippet based on the classified class cluster of the low dimensional descriptor of the query video snippet.

15. The event detection device according to claim 14, wherein the plurality of class clusters are mapped to corresponding event classes.

16. The event detection device according to claim 15, wherein the event classes include a cycle class and a not cycle class.

17. The event detection device according to claim 15, wherein the event classes include a plurality of action cycle classes.

18. The event detection device according to claim 14, further comprising:
the neural network encoder further configured to encode one or more labeled video snippets of a plurality of event classes into low dimensional descriptors of the labeled video snippets in the code space; and
the class cluster classifier further configured to map the plurality of event classes to class clusters corresponding to the low dimensional descriptors of the labeled video snippets.

19. The event detection device according claim 14, further comprising:
the neural network encoder further configured to encode a plurality of training video snippets into low dimensional descriptors of the training video snippets in the code space;
a neural network decoder configured to decode the low dimensional descriptors of the training video snippets into corresponding reconstructed video snippets; and
a loss function configured to adjust one or more parameters of the neural network encoder and the neural network decoder based on one or more objective functions selected from a group including to reduce a reconstruction error between the one or more training video snippets and the corresponding one or more reconstructed video snippets, to reduce class entropy of the plurality of event classes of the code space, to increase fit of the training video snippets, and to increase compactness of the code space.

20. The event detection device according claim 19, further comprising:
the neural network decoder further configured to decode the low dimensional descriptors of the query video snippets into corresponding reconstructed video snippets; and
the loss function further configured to adjust the one or more parameters of the neural network encoder and the neural network decoder based on the one or more objective functions.

21. An event detection device comprising:
a neural network encoder configured to encode a plurality of training video snippets into low dimensional descriptors of the training video snippets in the code space, including one or more labeled video snippets of a plurality of event classes;
a class cluster classifier configured to map the plurality of event classes to class clusters corresponding to the low dimensional descriptors of the labeled video snippets;
a neural network decoder configured to decode the low dimensional descriptors of the training video snippets into corresponding reconstructed video snippets; and
a loss function configured to adjust one or more parameters of the neural network encoder and the neural network decoder based on one or more objective functions selected from a group including to reduce a reconstruction error between the one or more training video snippets and the corresponding one or more reconstructed video snippets, to reduce entropy class entropy of the plurality of event classes of the code space, to increase fit of the training video snippets, and to increase compactness of the code space.

22. The event detection device according claim 21, wherein the plurality of class clusters are mapped to corresponding event classes.

23. The event detection device according claim 22, wherein the event classes include a cycle class and a not cycle class.

24. The event detection device according claim 22, wherein the event classes include a plurality of action cycle classes.

25. The event detection device according claim 21, further comprising:
the neural network encoder further configured to encode a query video snippet into a low dimensional descriptor of the code space, wherein the code space includes a plurality of class clusters characterized by one or more of a minimum trending reconstruction error, a minimum trending class entropy, a maximum trending fit of video snippets and a maximum compactness of the code space; and
the class cluster classifier further configured to classify the low dimensional descriptor of the query video snippet based on its proximity to a nearest one of a plurality of class clusters of the code space and output an indication of an event class of the query video snippet based on the classified class cluster of the low dimensional descriptor of the query video snippet.

26. The event detection device according to claim 25, further comprising:
a patch creator configured to subdivide frame of the query video snippet into a small number of patches and labeling patches with overlapping foreground objects; and
the neural network encoder further configured to encode the patches with overlapping foreground objects of the query video snippet into low dimensional descriptor of the code space.

* * * * *